United States Patent Office 3,652,560
Patented Mar. 28, 1972

1

3,652,560
3-[(ALKYLTHIO)METHYL]-1,2,3-BENZOTRIAZIN-4(3H)-ONES
John E. Livak, Midland, Mich., assignor to The Dow Chemical Company, Midland, Mich.
No Drawing. Filed June 18, 1970, Ser. No. 47,603
Int. Cl. C07d 55/08
U.S. Cl. 260—248 AS          5 Claims

ABSTRACT OF THE DISCLOSURE

Disclosed are compounds corresponding to the formula

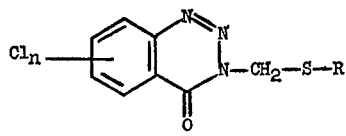

wherein R represents loweralkyl of 1 to 4 carbon atoms, inclusive, and $n$ represents an integer of 0, 1 or 3, the method of preparation and the use of these compounds as fungicides.

SUMMARY OF THE INVENTION

The present invention is directed to 1,2,3-benzotriazin-4-(3H)-one compounds corresponding to the formula

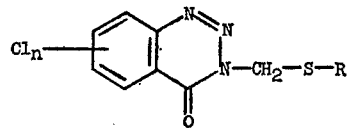

In this and succeeding formulae, R represents loweralkyl of 1 to 4 carbon atoms, inclusive, and $n$ represents an integer of 0, 1 or 3.

The compounds of the present invention are crystalline solids which are substantially insoluble in water and only slightly soluble in many common organic solvents. These compounds have specific utility as fungicides.

The new compounds of the present invention are prepared by condensing an alkyl mercaptan with an appropriate 3-(chloromethyl)-1,2,3,-benzotriazin-4(3H)-one in the presence of metranol and sodium methoxide.

Representative alkyl mercaptan reactants include, for example, methyl mercaptan, ethyl mercaptan, n-propyl mercaptan, isopropyl mercaptan, n-butyl mercaptan, t-butyl mercaptan and isobutyl mercaptan.

Representative 3 - (chloromethyl) - 1,2,3-benzotriazin-4-(3H)-one reactants include, for example, 3-chloromethyl)-1,2,3-benzotriazin-4(3H)-one, 5-, 6-, 7- or 8-chloro-3-(chloromethyl)-1,2,3-benzotriazin-4(3H)-one and 5,6,7- 5,6,8- or 6,7,8-trichloro-3-(chloromethyl)-1,2,3-benzotriazin-4(3H)-one.

The reaction is conveniently carried out by slowly adding the alkyl mercaptan to a mixture of methanol and sodium methoxide followed by the addition of the benzotriazin-4(3H)-one reactant thereto. The reaction mixture is maintained under reflux conditions for about 1 to 2 hours. The reaction is somewhat exothermic and the temperature can be controlled by regulation of the rate of contacting the reactants and/or by the amount of reaction medium present and/or by external cooling.

In carrying out the reaction, the reactants, including the sodium methoxide reaction promoter, are employed in at least equal molar proportions. Preferably, the alkyl mercaptan is employed in slight excess and the sodium methoxide can be used in an amount equivalent to the mercaptan reactant.

2

Upon completion of the reaction, the reaction mixture is filtered to remove sodium chloride formed as a reaction by-product. The filtrate is cooled to room temperature and the solid product which precipitates is recovered by filtration. The product, if desired, can be further purified by conventional procedures, such as, for example, crystallization from a lower alkanol.

DESCRIPTION OF SOME PREFERRED EMBODIMENTS

The following examples illustrate the present invention and the manner by which it can be practiced, but as such, should not be construed as limitations upon the overall scope of the same.

EXAMPLE I 7-chloro-3-[isopropylthio)methyl]-1,2,3-benzotriazin-4(3H)-one

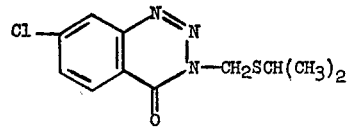

To a mixture of 200 milliliters of distilled methanol and 6.5 grams (0.12 mole) of sodium methoxide maintained at 23° C. was added dropwise 9.1 grams (0.12 mole) of 2-propanethiol. The temperature was allowed to rise to 30° C. during the addition. To this mixture was added a solution composed of 23.0 grams (0.1 mole) of 7-chloro-3-(chloromethyl)-1,2,3-benzotriazin-4(3H)-one dissolved in 250 milliliters of methanol. The mixture was heated under reflux (66° C.) for 1.5 hours and thereafter filtered hot to remove sodium chloride formed during the reaction. The filtrate was cooled to room temperature and the precipitate which formed was removed by filtration. The crude product was recrystallized from methanol and the 7-chloro - 3 - [isopropylthio)methyl] - 1,2,3 - benzotriazin-4(3H)-one product was recovered in a yield of 19.0 grams and melted at 84°–85° C. The product was found by analysis to have chlorine, nitrogen and sulfur contents of 13.2, 15.5 and 12.2 percent, respectively, as compared with the theoretical contents of 13.2, 15.6 and 11.9 percent, respectively, calculated for the above-named structure.

The following compounds of the present invention are prepared in accordance with the methods set forth hereinbefore.

5 - chloro - 3 - [methylthio)methyl]-1,2,3-benzotriazin-4(3H)-one having a molecular weight of 241.62, prepared by the condensation of methyl mercaptan with 5-chloro-3-(chloromethyl)-1,2,3-benzotriazin-4(3H)-one.

3 - [(isopropylthio)methyl] - 1,2,3 - benzotriazin-4(3H)-one having a melting point of 60°–61° C., prepared by the condensation of isopropyl mercaptan with 3-(chloromethyl)-1,2,3-benzotriazin-4(3H)-one.

6 - chloro-3 - [(t - butylthio)methyl] - 1,2,3 - benzotriazin-4(3H)-one having a molecular weight of 283.65, prepared by the condensation of t-butyl mercaptan with 6-chloro-3-(chloromethyl)-1,2,3-benzotriazin-4(3H)-one.

3 - [(t - butylthio)methyl] - 5,6,7 - trichloro - 1,2,3-benzotriazin-4(3H)-one having a molecular weight of 352.57, prepared by the condensation of t-butyl mercaptan with 3 - (chloromethyl)-5,6,7-trichloro-1,2,3-benzotriazin-4(3H)-one.

3 - [(isopropylthio)methyl] - 6,7,8 - trichloro - 1,2,3-benzotriazin-4(3H)-one melting at 112°–113° C., prepared by the condensation of isopropyl mercaptan with 3-(chloromethyl) - 6,7,8 - trichloro - 1,2,3 - benzotriazin-4(3H)-one.

3 - [(n - propylthio)methyl] - 5,7,8 - trichloro - 1,2,3-benzotriazin-4(3H)-one having a molecular weight of 338.56, prepared by the condensation of n-propyl mercaptan with 3-(chloromethyl)-5,7,8-trichloro-1,2,3-benzotriazin-4(3H)-one.

6 - chloro - 3 - [isopropylthio)methyl] - 1,2,3 - benzotriazin-4(3H)-one melting at 73°–74° C., prepared by the condensation of isopropyl mercaptan with 6-chloro-3-(chloromethyl)-1,2,3-benzotriazin-4(3H)-one.

3 - [(ethylthio)methyl] - 1,2,3 - benzotriazin - 4(3H)-one having a molecular weight of 221.17, prepared by the condensation of ethyl mercaptan with 3-(chloromethyl)-1,2,3-benzotriazin-4(3H)-one.

In accordance with the present invention, it has been discovered that the benzotriazinones can be employed in the control of many fungal pests. For such uses, the compounds can be employed in an unmodified form or dispersed on a finely divided solid and employed as dusts. Such mixtures can also be dispersed in water with or without the aid of a surface-active agent and the resulting aqueous suspension employed as a spray. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid diluents to produce the ultimate treating compositions.

The exact concentration of the toxicant to be employed in the treating compositions is not critical and may vary considerably provided the required dosage of the effective agent is supplied. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight.

In a representative operation, substantially complete kill and control of the causative organisms of downey mildew was obtained when one of 3-[(isopropylthio)methyl]-1,2,3-benzotriazin-4(3H)-one, 6-chloro-3-[(isopropylthio)methyl]-1,2,3-benzotriazin-4(3H)-one or 6,7,8 - trichloro - 3 - [(isopropylthio)methyl] - 1,2,3 - benzotriazin-4(3H)-one was employed as the sole toxicant in a liquid dispersion at a concentration of 400 parts per million by weight of the ultimate dispersion.

In another operation, 3-[(isopropylthio)methyl]-1,2,3-benzotriazin-4(3H)-one, when employed as the sole toxicant in a nutrient agar at a concentration of 500 parts by weight of the compound per million parts of agar, gave 100 percent kill and control of the organisms *Trichophyton mentagrophytes, Candida pelliculosa, Pullularia pullulans* and acid fast bacterium.

In other operations, 6-chloro-3[(isopropylthio)methyl]-1,2,3-benzotriazin-4(3H)-one, when employed as the sole toxicant in a nutrient agar at a concentration of 500 parts by weight of the compound per million parts of agar, gave 100 percent kill and control of the organisms *Trichophyton mentagrophytes* and acid fast bacterium.

In another operation, substantial kill and control of the causative organism of tomato late blight was obtained when 7 - chloro-3-[(isopropylthio)methyl]-1,2,3-benzotriazin-4(3H)-one was employed as the sole toxicant in a liquid dispersion at a concentration of 400 parts per million by weight of the ultimate dispersion.

PREPARATION OF STARTING MATERIALS

The 3 - (chloromethyl) - 1,2,3-benzotriazin-4(3H)-one compounds employed as starting materials are prepared by the reaction of the corresponding (hydroxymethyl)-1,2,3-benzotriazin-4(3H)-one with a chlorinating agent such as, for example, hydrochloric acid, phosphorus pentachloride or thionyl chloride, in the presence of an inert solvent. The preparation of the chlorine substituted 3-chloromethyl)-1,2,3-benzotriazin-4(3H)-one by a similar procedure is taught in U.S. Pat. No. 3,502,670.

What is claimed is:

1. A compound corresponding to the formula

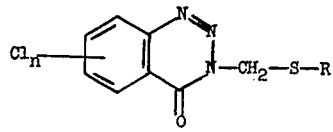

wherein R represents loweralkyl of 1 to 4 carbon atoms, inclusive, and $n$ represents an integer of 0, 1 or 3.

2. The compound of claim 1 where is 3[(isopropylthio)methyl]-1,2,3-benzotriazin-4(3H)-one.

3. The compound of claim 1 which is 6-chloro-3-[(isopropylthio)methyl]-1,2,3-benzotriazin-4(3H)-one.

4. The compound of claim 1 which is 7-chloro-3-[(isopropylthio)methyl]-1,2,3-benzotriazin-4(3H)-one.

5. The compound of claim 1 which is 3-[(isopropylthio)methyl]-6,7,8-trichloro-1,2,3-benzotriazin-4(3H)-one.

References Cited

UNITED STATES PATENTS 3,502,670   3/1970   Rigterink _____ 260—248

JOHN M. FORD, Primary Examiner

U.S. Cl. X.R.

424—249

PO-1050
(5/69)

UNITED STATES PATENT OFFICE
CERTIFICATE OF CORRECTION

Patent No. 3,652,560        Dated 28 March 1972

Inventor(s) John E. Livak

It is certified that error appears in the above-identified patent and that said Letters Patent are hereby corrected as shown below:

Column 1, line 56, insert --5,7,8-- between "5,6,8-" and "or".

Signed and sealed this 25th day of July 1972.

(SEAL)
Attest:

EDWARD M. FLETCHER, JR.
Attesting Officer

ROBERT GOTTSCHALK
Commissioner of Patents